(12) United States Patent
Davies

(10) Patent No.: US 9,914,529 B2
(45) Date of Patent: Mar. 13, 2018

(54) TORQUE LIMITATION SYSTEMS AND METHODS

(71) Applicant: GOODRICH ACTUATION SYSTEMS LIMITED, West Midlands (GB)

(72) Inventor: Stephen H. Davies, Shrewsbury (GB)

(73) Assignee: GOODRICH ACTUATION SYSTEMS LIMITED, West Midlands (GB)

( * ) Notice: Subject to any disclaimer, the term of this patent is extended or adjusted under 35 U.S.C. 154(b) by 48 days.

(21) Appl. No.: 14/706,054

(22) Filed: May 7, 2015

(65) Prior Publication Data
US 2015/0369319 A1    Dec. 24, 2015

(30) Foreign Application Priority Data

Jun. 23, 2014  (EP) .................................. 14275141

(51) Int. Cl.
*B64C 13/28* (2006.01)
*F16D 59/00* (2006.01)
*F16D 67/00* (2006.01)
*F16H 35/10* (2006.01)
*F16D 125/36* (2012.01)

(52) U.S. Cl.
CPC .............. *B64C 13/28* (2013.01); *F16D 59/00* (2013.01); *F16D 67/00* (2013.01); *F16H 35/10* (2013.01); *F16D 2125/36* (2013.01)

(58) Field of Classification Search
CPC .......... B64C 13/24–13/34; F16D 59/00; F16D 67/00; F16D 2125/36; F16H 35/10
USPC ........................................................ 192/223.3
See application file for complete search history.

(56) References Cited

U.S. PATENT DOCUMENTS

| 3,898,817 | A  | * | 8/1975 | Capewell | ................ B64C 13/00 188/134 |
|---|---|---|---|---|---|
| 4,779,822 | A  |   | 10/1988 | Burandt et al. | |
| 6,419,606 | B1 |   | 7/2002 | Tengan et al. | |
| 2006/0060719 | A1 |   | 3/2006 | Hauber et al. | |
| 2009/0250308 | A1 | * | 10/2009 | Hadley | ................... B64C 13/28 192/223.2 |

OTHER PUBLICATIONS

European Patent Office Search Report; Application No. 14275141.1; dated Dec. 10, 2014; 5 pages.

* cited by examiner

*Primary Examiner* — Richard M Lorence
(74) *Attorney, Agent, or Firm* — Cantor Colburn LLP

(57) ABSTRACT

A torque limited drive system comprising: an input shaft; at least one gear unit driven by the input shaft; a torque limiter having a torque limit and being driven by the at least one gear unit; and a torque limited output shaft driven by the torque limiter; wherein the torque limiter is adapted such that when it experiences a torque above its torque limit it applies a brake to said input shaft. The fact that the torque limiter is situated downstream of the gear units combined with the fact that the torque limiter brakes the input shaft upstream of the gear unit allows minimization of component weight within the gear units and within equipment driven by the output shaft due to the removal of the effect of efficiency and drag bandwidths associated with the gear units.

13 Claims, 3 Drawing Sheets

TORQUE LIMITATION SYSTEMS AND METHODS

CROSS REFERENCE TO RELATED APPLICATIONS

This application claims priority to European Patent (EP) application No. 14275141.1 filed Jun. 23, 2014, the entire contents of which are incorporated herein by reference.

BACKGROUND

In an aircraft, secondary flight control systems typically include a series of high ratio rotary actuators, each linked to an external flap or slat surface, and all interconnected by a transmission shaft system that delivers power from a centralised Power Drive Unit (PDU). The centralised PDU provides sufficient power to drive all surfaces of the system.

In certain failure cases, all the PDU power can be diverted to one particular actuator, for example in the case of a track jam adjacent to the actuator.

To protect the actuator in question, a torque limiter device is typically incorporated into the actuator input in order to prevent full power from being transmitted into the jammed track. This arrangement is illustrated in FIG. 1.

The torque limiter has to be set to a minimum level that prevents inadvertent torque limiter operation (and consequent system arrest) in normal operation. On the one hand, the airframer wants to minimise this value in order to minimise design loads into the aircraft structure, while on the other hand the system supplier wants to set this value at a high enough level to avoid nuisance tripping of the torque limiter. The margin between these boundaries is further compounded by two factors:

1) Temperature affects the actuator drags and efficiencies. In particular, lubricant within the actuator and the gear boxes that connect the actuator to the PDU drive shaft changes viscosity with temperature. This in turn alters the resistance of these components, i.e. the drag experienced by the drive system.
2) The fundamental efficiency bandwidth of the downstream power stage of the actuator affects the energy absorbed by the drive train between the output shaft of the torque limiter and the actuator. This efficiency changes over time, typically improving as time goes on as the gear teeth wear down and clearances between system components increase, leading to lower resistance.

The torque limiter's limit must be set sufficiently high that when the efficiency is low and the drag is high (e.g. early in service life and at low temperature) sufficient torque can be transmitted through the torque limiter and the drive train to drive the actuator. However, this high torque limit setting means that when the efficiency is high and the drag is low (e.g. at long life and high temperature), the potential torque transmitted through to the actuator is much higher than required. However, the manufacturer must build the actuator and associated structures with sufficient strength to withstand this potential torque.

BRIEF DESCRIPTION

This disclosure relates to a torque limitation system and to methods of torque limitation. In particularly preferred forms, the disclosure relates to torque limitation systems and methods for aircraft systems such as secondary flight control surface actuator systems.

BRIEF DESCRIPTION OF THE DRAWINGS

One or more non-limiting examples will now be described, by way of example only, and with reference to the accompanying figures in which.

DETAILED DESCRIPTION

Figure 1:
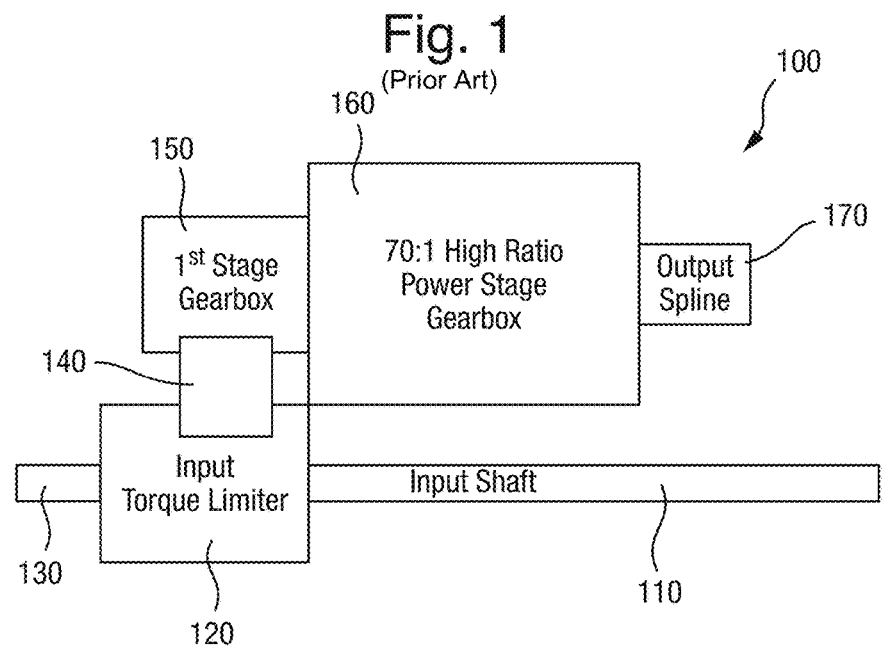
FIG. 1 shows a traditional torque limiter installation.

A detailed description of one or more embodiments of the disclosed apparatus and method are presented herein by way of exemplification and not limitation with reference to the Figures.

According to a first aspect of this disclosure, there is provided a torque limited drive system comprising: an input shaft; at least one gear unit driven by the input shaft; a torque limiter having a torque limit and being driven by the at least one gear unit; and a torque limited output shaft driven by the torque limiter; wherein the torque limiter is adapted such that when it experiences a torque above its torque limit it applies a brake to said input shaft.

Placing a torque limiter on the output side of the gear unit means that the drag bandwidth and the efficiency bandwidth of the intermediate gears do not have to be accommodated by the manufacturer. This allows the torque limiter's limit to be set much closer to the desired ideal torque limit and this in turn means that components downstream of the torque limiter can be designed and engineered to lower specifications and can thus be made lighter and smaller.

Additionally, the fact that the torque limiter applies a brake to the input shaft upstream of the gear unit rather than applying a brake to the direct input to the torque limiter (which is the typical arrangement) also means that the gear unit does not need to be over-engineered to resist high torque from the input shaft. To explain this further, positioning the torque limiter downstream of the gear unit avoids the issues associated with the efficiency and drag bandwidths of the gear unit. However, if the torque limiter is arranged only to brake its own direct input shaft (i.e. the output from the gear unit) then as increased torque is applied to the input shaft, that increased torque is also applied to the gears within the gear unit. The gear unit and the input shaft would have to be engineered sufficiently strongly to withstand any increased torque that may be applied. This increases the size and weight of these components, offsetting the gains that can be made in components downstream of the torque limiter. By applying the brake to the input shaft at a point before the take-off for the brake unit, as soon as an overtorque condition arises, the input shaft is stopped (braked, gripped, clamped, etc.) to prevent further torque from building within the gear unit. Therefore the gear unit and all transmission shafts within the actuator system can be designed closer to the ideal torque and thus sizes and weights of these components can be minimized.

In operation, at lower torque values (less than the torque limiter's torque limit and thus below the overtorque condition), the input shaft transmits torque to the gear unit (via a suitable take-off such as a beveled or spur gear arrangement), the gear unit alters (typically increases) the torque by changing (typically gearing down) the rotation speed, and the torque limiter transmits this torque through to the output shaft for operation of some component or machinery (e.g. an actuator). The brake on the input shaft remains disengaged. As higher torque values are reached (high enough to generate an overtorque condition in the torque limiter), the input shaft transmits torque to the gear unit, the gear unit alters the torque by changing the rotation speed, and the torque limiter is activated by the increased torque and consequently engages the brake on the input shaft, thus preventing any further torque transfer to the gear unit (or indeed to the input shaft downstream of the brake).

The gear unit may be any appropriate gearing, e.g. one or more interconnected gears or one or more gear boxes. The gearing may include known arrangements of bevel gears, spur gears, worm gears, planetary gears, etc. Typically the gear unit will generate an increased torque by gearing down the rotation speed from the input shaft.

Preferably the connection between the torque limiter and the brake has a high stiffness. This connection may take any suitable form according to the circumstances, e.g. it may be a lever, a series of gears or a transmission shaft. The connection does not need to be able to transmit a high force (just high enough to engage the brake), but if the connection is compliant (has a low stiffness), it will delay the effect of actuating the brake, thus allowing torque to continue to build in other components. Preferably the connection between the torque limiter and the brake has a stiffness greater than that of the connection between the input shaft and the torque limiter input. This ensures that once the torque limit is reached, the brake is engaged firmly and further torque increase is resisted and is not able to build in the more compliant (less stiff) components downstream of the brake. For example, there will be stiffness associated with each of the components that form the drive train downstream of the point at which the brake acts. These may include a part of the input shaft, the various gears and shafts of the gear unit(s), and the transmission shaft from the gear unit to the input of the torque limiter. Each of these will have its own stiffness and a composite stiffness can be calculated for the combination of these components as a whole. This composite stiffness is preferably lower than a composite stiffness calculated for the components that perform the actuation of the brake.

It may be that the preferred materials and components already result in a stiffness ratio that achieves this result. However, in some preferred examples, an element in the drive train between the brake on the input shaft and the input to the torque limiter is formed from a relatively compliant material. This component is designed to be compliant relative to the other components around it and/or compliant relative to the components of the brake actuation mechanism. This ensures that the stiffness ratio discussed above is achieved. The compliance of the selected component may be designed to ensure this functionality across the whole range of possible operating temperatures and strains. In some preferred examples, the compliant component is part of the gear unit driven by the input shaft. In other preferred examples the compliant component is formed in the input shaft. The compliant component may be the whole of the input shaft or it may be just a part or section of it.

The mechanism by which actuation of the torque limiter is translated into actuation of the brake may be any suitable form. For example, electronic sensors and electronic (e.g. electromechanical or electromagnetic) actuators may be used to sense the overtorque condition and actuate the brake respectively. However, in many preferred forms, a mechanical arrangement is preferred for simplicity and reliability. The torque limiter may comprise a ramp roller element, the ramp roller element comprising two opposed ramped surfaces that move relative to one another when a torque greater than the torque limit is applied. Such ramp roller elements are commonly used in torque limiters. Typically ball bearings are located between the two opposed ramped surfaces and the two surfaces are biased towards each other with a preload that determines the torque limit. The angle of the ramps and the preload are such that below the torque limit, torque applied to one ramped surface is transmitted through the ball bearings to the other ramped surface, causing rotation of the other ramped surface (and thus transmission of the torque) without inducing movement of the ramps relative to one another (and thus not inducing any relative movement in the ball bearings either). When the applied torque exceeds the preload force, the ball bearings roll on the two ramped surfaces, causing relative movement of the two ramped surfaces.

The ramped surfaces may separate axially when a torque greater than the torque limit is applied. An actuator may be connected to the ramp roller element (one of the opposed components of the ramp interface) such that axial separation of the ramp roller surfaces causes engagement of the brake on the input shaft. Such a mechanism may for example use a lever or a cam arrangement either to transfer the axial motion or to translate the axial motion into rotational motion that causes engagement of the brake. For example, a brake pad may be brought into engagement with the shaft or friction plates may be brought into engagement with each other so as to resist motion of the input shaft.

Alternatively (although it will be appreciated that this motion may occur in addition to the axial motion described above) the ramped surfaces rotate relative to one another when a torque greater than the torque limit is applied. An actuator may be connected to the ramp roller element such that the relative rotation of the ramp roller surfaces causes engagement of the brake on the input shaft. The relative rotation of the two ramp roller surfaces may drive a differential gear mechanism that detects relative rotation between the two surfaces by generating a motion that actuates the brake only when the two surfaces rotate relative to one another, but not when they rotate together.

The gear ratio will depend on the various installation in which the system is to be used. However, the greatest benefits are found in systems with high efficiency bandwidths and high drag bandwidths. These tend to occur in high ratio gear boxes such as those with a gear ratio of at least 50:1. Therefore preferably the gear unit has a gear ratio of at least 50:1, more preferably at least 70:1, yet more preferably at least 100:1. It will be appreciated that this ratio may be achieved with a single gear box or by interconnecting multiple gearing mechanisms or multiple gear boxes. Gear arrangements with higher numbers of components will likely experience higher efficiency and drag bandwidths and this will also see the greatest benefits.

According to a further aspect of this disclosure, there is provided an aircraft secondary flight control actuator system comprising one or more torque limited drive systems as described above (optionally including any of the preferred features also described above). The transmission systems for secondary flight control surfaces in aircraft often use a number of actuators all connected to the same Power Drive Unit (PDU). The PDU provides sufficient torque for all actuators and thus if one actuator jams, an overtorque condition can very quickly be reached. Thus the teachings of this disclosure are particularly pertinent to such implementations.

According to yet a further aspect of this disclosure, there is provided a method of limiting the torque applied by an input shaft through a gear unit to an output shaft, comprising: detecting a torque applied on said output shaft; when said torque on said output shaft exceeds a torque limit, actuating a brake on said input shaft to prevent further transfer of torque to said output shaft.

The preferred features described above in relation to the apparatus apply equally to this method. The step of actuating may comprise actuating based on relative movement of the apposed ramp roller surfaces. The step of actuating may be based on relative axial movement. The step of actuating may be based on relative rotational movement.

According to yet a further aspect of this disclosure, there is provided a method of limiting torque in an aircraft secondary flight control actuator system, in which torque is applied by an input shaft through a gear unit to an output shaft, comprising: detecting a torque applied on said output shaft; when said torque on said output shaft exceeds a torque limit, actuating a brake on said input shaft to prevent further transfer of torque to said output shaft.

FIG. 1 shows a traditional torque limiter installation 100 used in a secondary flight control surface actuator system. Shaft 110 is driven from the right in FIG. 1 by a Power Drive Unit (PDU, not shown). A torque limiter 120 is driven by input shaft 110 and performs the dual functions of passing torque from the input shaft 110 on to further actuators (with further torque limiters) via shaft 130 and also taking off torque via connecting gear 140 to drive 1st stage gear box 150 which in turn drives power stage gear box 160 which produces an output torque on output shaft 170 that is used to drive the actuator of the secondary flight control surface (not shown).

Typically 1st stage gear box 150 has a lower gear ratio (e.g. 6:1 in some examples), while second stage (power stage) gear box 160 has a higher gear ratio such as 50:1. Thus the total gear ratio between the input shaft 110 and output shaft 170 is for example 200:1 to 300:1. This creates a large mechanical advantage and a large magnification of the input torque.

In operation, the torque limiter 120 will trip above a predetermined torque limit. Upon tripping, the input shaft 110 will be locked and no further torque will be transferred to output shaft 170. However, when the input torque on input shaft 110 is below the torque limit, the range of output torques on output shaft 170 is high. This is largely due to the efficiency bandwidth and the drag bandwidth associated with the gear stages 150, 160. Each gear unit 150, 160 has an efficiency which determines what proportion of the torque entering the gear unit 150, 160 is transmitted to the output of the gear unit 150, 160. This efficiency is not constant, but varies with temperature as well as with time. Thermal expansion of the components affects the clearances between them, which in turn affects the efficiency with which energy is transferred through the unit. As the unit is used, wear on the components increases clearances between them and typically increases the efficiency by reducing resistance. Therefore during the lifetime of a gear unit 150, 160 the efficiency changes and therefore for a given input torque, the output torque changes. This range of operational output due to efficiency is known as the efficiency bandwidth of the gear unit 150, 160. At the same time, gear units 150, 160 are lubricated to reduce the resistance incurred through friction. However, the viscosity of the lubricant changes with temperature and therefore the drag experienced within the unit changes with temperature. Temperature changes with use as the unit heats up through friction, as well as changing with seasons, geographical location, and in the case of aircraft with flying altitude. These fluctuations in temperature change the resistance that the gear unit 150, 160 provides to an input torque and thus for a given input torque, the output torque varies with temperature. This range of operational output due to drag is known as the drag bandwidth.

Figure 2:
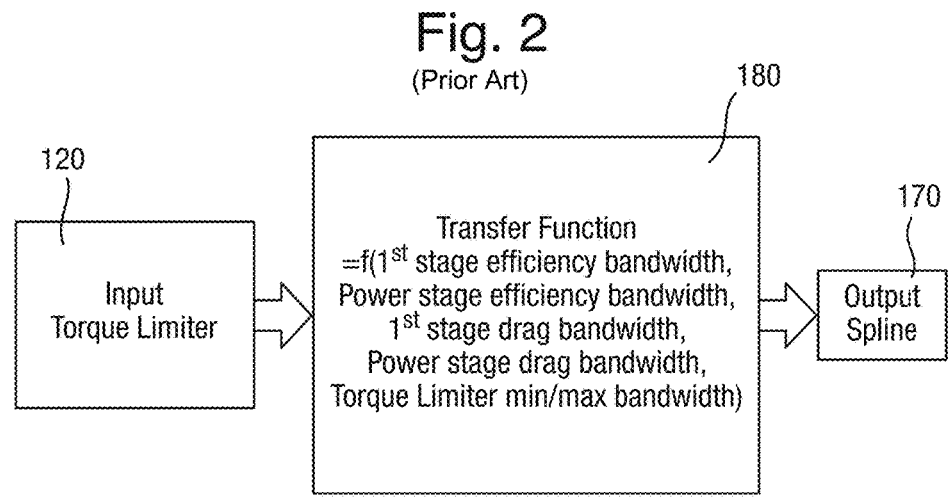
FIG. 2 illustrates a torque transfer function for the installation of FIG. 1.

For a given input torque on input shaft 110, the torque output on output shaft 170 is a function of the efficiency bandwidth and the drag bandwidth of each gear box 150, 160 (and more generally of each intermediate component) between the torque limiter 120 and the output shaft. This is schematically illustrated in FIG. 2 which shows a transfer function 180 representing all intervening components (in this case 1st stage gear box 150 and power stage gear box 160). The transfer function 180 depends on the 1st stage efficiency bandwidth of gear box 150, the power stage efficiency bandwidth of gear box 160, the 1st stage drag bandwidth of gear box 150, the power stage bandwidth of gear box 160 and the torque limiter min/max bandwidth.

The torque limiter min/max bandwidth is caused by friction and energy absorption within the torque limiter itself. For example, there is friction at various bearing surfaces and interfaces within the torque limiter that slide and/or roll when the overtorque condition is reached and the torque limiter is activated. As with the gear boxes, the frictional coefficient of these surfaces varies with operating conditions and thus gives rise to a torque output bandwidth that must be accommodated in the downstream equipment and components.

The effect of these bandwidths is that, although the torque limiter 120 always trips at its preset torque limit, the output torque on shaft 170 at that point can take a wide range of torque values depending on the current operating conditions. The equipment manufacturer needs to design the equipment connected to (i.e. downstream of) output shaft 170 so that it can withstand the maximum torque that may be produced on shaft 170 before torque limiter 120 trips. This will be when the resistance and energy absorption within the gear boxes 150, 160 is at a minimum so that the maximum torque transfer occurs. This will be for example at high temperature (low viscosity and hence low drag) and at a certain stage within the service life when wear and clearances minimize resistance. This maximum possible transmitted torque may be significantly above the torque limit of torque limiter 120 and therefore the equipment driven by shaft 170 has to be over-engineered (and thus larger and heavier) compared with what would be required by the minimum torque necessary for normal operation.

Figure 3:
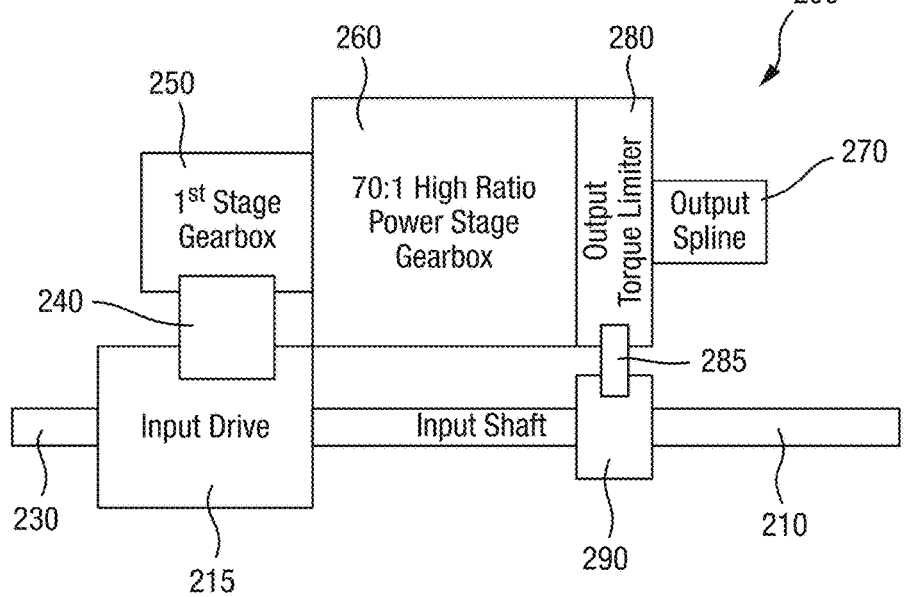
FIG. 3 shows an improved torque limiter installation.

FIG. 3 shows an example of an improved torque limiter arrangement 200. In this arrangement the input shaft 210 is driven from the right in FIG. 3 by a PDU (not shown). The input shaft 210 transfers torque through an input drive 215 that passes torque along to the continuing drive shaft 230 as well as taking off torque to connecting gear 240 and transferring it to 1st stage gear box 250 and second (power) stage gear box 260.

In this example, the torque limiter 280 is positioned between the gear units 250, 260 and the output shaft 270. As the torque limiter 280 is downstream of all of the gear units 250, 260, the efficiency and drag bandwidths of those units 250, 260 do not affect the maximum torque transferred to output shaft 270. Instead, the torque limiter 280 can be set with an appropriate torque limit slightly higher (to provide a margin of safety) than is required for normal operation. In the event of a jam which could result in a higher input torque, the torque limiter will immediately limit the onward torque on output shaft 270. This means that the manufacturer does not need to design the equipment connected to output shaft 270 to withstand excessive torque. Thus the equipment components and mounting structures can be minimized in size and weight. This is of particular advantage in aircraft design where additional size and weight increases drag and fuel consumption which in turn increases the cost of operation and the combustion emissions.

A conventional torque limiter arrangement locks its own direct input shaft in order to prevent further torque from building up downstream of the torque limiter. However, as can be seen in FIG. 3, such an arrangement would still allow increased torque to build up within the gear boxes 250, 260, connecting gear 240, input drive unit 215 and input shaft 210. Therefore all of these components need to be designed and engineered to withstand high torques and the same increased size and weight issues apply. To avoid this problem, torque limiter 280 brakes the input shaft 210 rather than braking its own direct input shaft (not shown) from power stage gearbox 260. When torque limiter 280 trips (i.e. when an overtorque condition is reached), the torque limiter 280 actuates brake 290 via actuator 285. Brake 290 brakes the input shaft 210 which thus prevents any increased torque from being transferred into any of the downstream components including input drive 215, connecting gear 240, 1st stage gearbox 250 and power stage gearbox 260. Therefore each of these components can also be designed and engineered to withstand just the normal operational torque (including any safety margin) and thus the size and weight of these components can be minimized.

Figure 4:
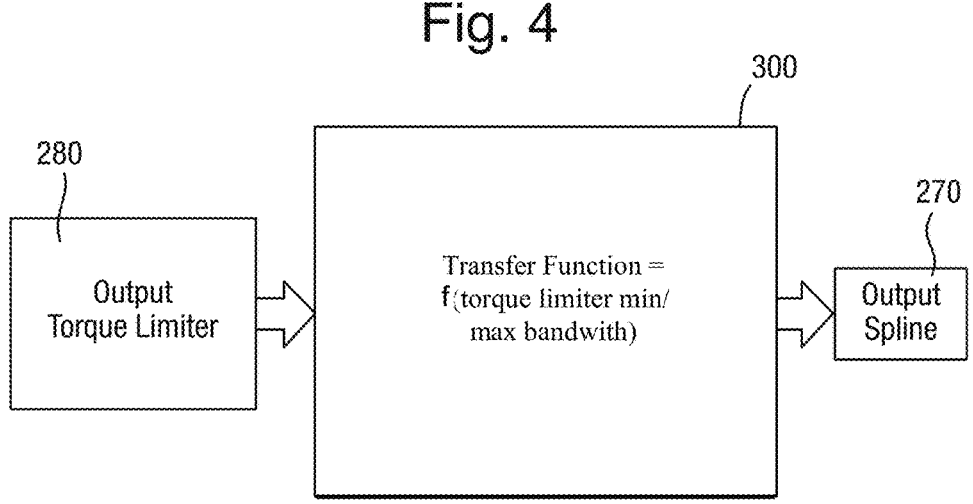
FIG. 4 illustrates the transfer function for the installation of FIG. 3.

FIG. 4 illustrates the transfer function 300 of this system by comparison with the transfer function 180 shown in FIG. 2. As shown, the efficiency bandwidth and the drag bandwidth associated with each of the 1st stage gearbox 250 and power stage gearbox 260 have been eliminated. The only remaining component is the torque limiter min/max bandwidth. Thus, the example of FIG. 3 eliminates both efficiency and drag variables associated with the 1st stage and power stage gearboxes 250, 260 from the transfer function 300 that determines the loads to the downstream structure as a function of input torque.

Figure 5A:
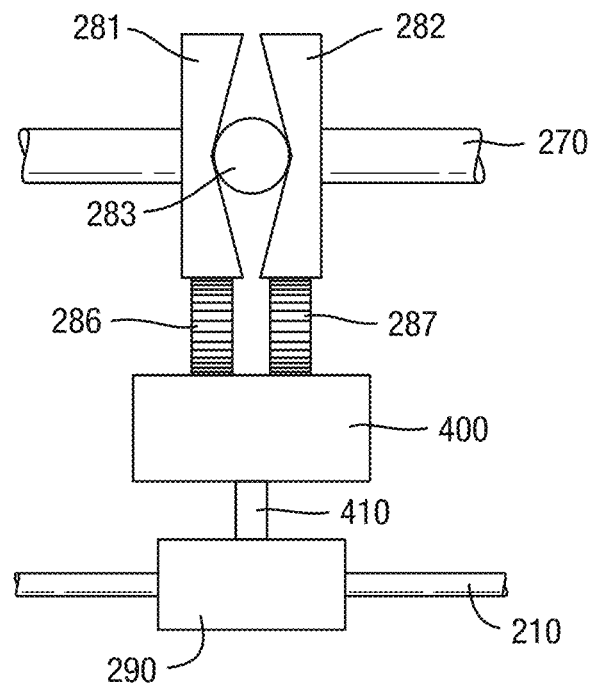
FIG. 5a illustrates schematically an actuator based on relative rotational movement.

FIG. 5a illustrates schematically an actuator 285 that operates based on relative rotational movement of a first ramp roller surface 281 and a second ramp roller surface 282 either side of a ramp roller ball 283. First ramp roller surface 281 is connected to a differential gear mechanism 400 via gear 286. Second ramp roller surface 282 is connected to differential gear mechanism 400 via gear 287. Differential gear mechanism 400 produces rotation on output shaft 410 based on the difference in rotation between input gears 286 and 287. Rotation on differential output shaft 410 causes engagement of brake 290 to brake system input shaft 210.

Figure 5B:
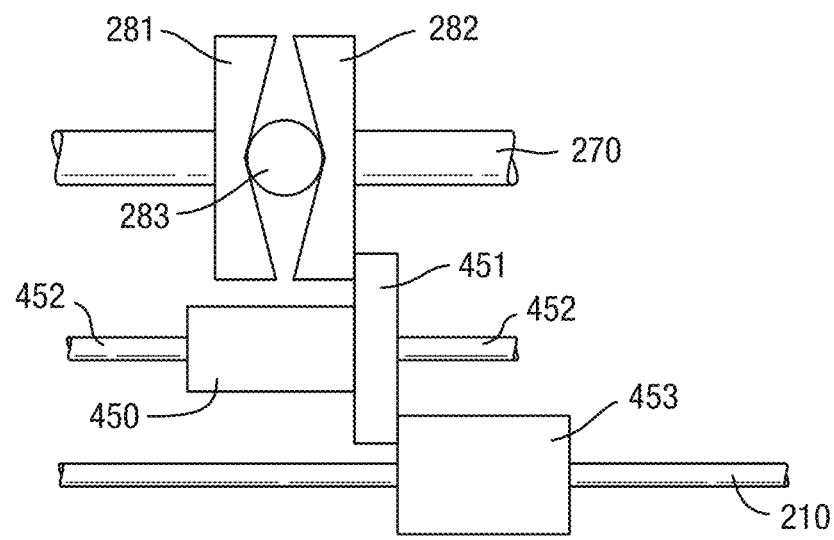
FIG. 5b illustrates schematically an actuator based on relative axial movement.

FIG. 5b schematically illustrates an alternative example of an actuator 285 that operates based on relative axial movement of a first ramp roller surface 281 and a second ramp roller surface 282 either side of a ramp roller ball 283. In this example, an overtorque condition causes second ramp roller surface 282 to displace to the right in the diagram. This presses on flange 451 of actuator 450 which is slidably mounted on shaft 452. Displacement of actuator 450 causes compression of a suite of brake discs 453 on system input shaft 210.

It will be appreciated that although the examples above are described with reference to secondary flight control actuators, the teachings of this disclosure are not limited to such implementations. Rather, it will be appreciated that the disclosure is applicable to other rotary actuators with a high gearbox ratio. The advantages of this disclosure become truly differentiating in multi-actuator systems driven by a centralised PDU as these involve potentially very high torques combined with high efficiency and drag bandwidths which have traditionally put severe constraints upon the minimization of component size and weight. Other non-limiting examples include implementations in weapon bay door systems and more generally implementations in any hinge line actuation system.

The fact that the torque limiter is situated downstream of the gear units combined with the fact that the torque limiter brakes the input shaft upstream of the gear unit allows minimization of component weight within the gear units and within equipment driven by the output shaft due to the removal of the effect of efficiency and drag bandwidths associated with the gear units.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed:

1. A torque limited drive system comprising:
   an input shaft;
   at least one gear unit driven by the input shaft;
   a torque limiter having a torque limit and being driven by the at least one gear unit; and
   a torque limited output shaft driven by the torque limiter;
   wherein the torque limiter is adapted such that when it experiences a torque above its torque limit it applies a brake to said input shaft;
   wherein a connection between the torque limiter and the brake has a stiffness greater than that of a connection between the input shaft and the torque limiter input.

2. A torque limited drive system as claimed in claim 1, wherein an element in a drive train between the brake on the input shaft and the input to the torque limiter is formed from a compliant material.

3. A torque limited drive system as claimed in claim 2, wherein the element of compliant material is part of the gear unit driven by the input shaft.

4. A torque limited drive system as claimed in claim 2, wherein the element of compliant material is formed in the input shaft.

5. A torque limited drive system as claimed in claim 1, wherein the torque limiter comprises a ramp roller element, the ramp roller element comprising two opposed ramped surfaces that move relative to one another when a torque greater than the torque limit is applied.

6. A torque limited drive system as claimed in claim 5, wherein the ramped surfaces separate axially when a torque greater than the torque limit is applied.

7. A torque limited drive system as claimed in claim 6, wherein an actuator is connected to the ramp roller element such that axial separation of the ramped surfaces causes engagement of the brake on the input shaft.

8. A torque limited drive system as claimed in claim 5, wherein the ramped surfaces rotate relative to one another when a torque greater than the torque limit is applied.

9. A torque limited drive system as claimed in claim 8, wherein an actuator is connected to the ramp roller element such that the relative rotation of the ramped surfaces causes engagement of the brake on the input shaft.

10. A torque limited drive system as claimed in claim 9, wherein the relative rotation of the ramped surfaces drives a differential gear mechanism that causes engagement of the brake on the input shaft.

11. A torque limited drive system as claimed in claim 1, wherein the gear unit has a gear ratio of at least 50:1.

12. A method of limiting the torque applied by an input shaft through a gear unit driven by the input shaft and through a torque limiter driven by the gear unit to an output shaft driven by the torque limiter, comprising:
    detecting a torque applied on said output shaft;
    when said torque on said output shaft exceeds a torque limit, actuating a brake on said input shaft to prevent further transfer of torque to said output shaft;
    providing a connection between the torque limiter and the brake; and
    providing a connection between the input shaft and the torque limiter input, wherein the stiffness of the connection between the torque limiter and the brake is greater than the stiffness of the connection between the input shaft and the torque limiter input.

13. A torque limited drive system comprising:
    an input shaft;
    at least one gear unit driven by the input shaft;
    a torque limiter having a torque limit and being driven by the at least one gear unit; and
    a torque limited output shaft driven by the torque limiter;
    wherein the torque limiter is adapted such that when it experiences a torque above its torque limit it applies a brake to said input shaft;
    wherein the torque limiter comprises a ramp roller element, the ramp roller element comprising two opposed ramped surfaces that move relative to one another when a torque greater than the torque limit is applied;
    wherein an actuator is connected to the ramp roller element such that the relative rotation of the ramped surfaces causes engagement of the brake on the input shaft; and
    wherein the relative rotation of the ramped surfaces drives a differential gear mechanism that causes engagement of the brake on the input shaft.

* * * * *